Aug. 5, 1924.

A. C. BARROW

Re. 15,886

PATCH POCKET

Original Filed May 5, 1922

Inventor

Alfred C. Barrow

By Cushman, Bogard & Vieth

Attorneys

Reissued Aug. 5, 1924. Re. 15,886

UNITED STATES PATENT OFFICE.

ALFRED C. BARROW, OF LYNCHBURG, VIRGINIA, ASSIGNOR, BY MESNE ASSIGNMENTS, TO PATENT POCKET CORPORATION, OF LYNCHBURG, VIRGINIA, A CORPORATION OF VIRGINIA.

PATCH POCKET.

Original No. 1,457,812, dated June 5, 1923, Serial No. 558,669, filed May 5, 1922. Application for reissue filed June 3, 1924, Serial No. 717,667.

*To all whom it may concern:*

Be it known that I, ALFRED C. BARROW, a citizen of the United States, residing at Lynchburg, in the county of Campbell and State of Virginia, have invented certain new and useful Improvements in Patch Pockets; and I do hereby declare the following to be a full, clear, and exact description of the invention, such as will enable others skilled in the art to which it appertains to make and use the same.

This invention relates to improvements in overalls or work garments, and more particularly to an improved patch pocket therefor.

It is well known that the bottom of the pockets of work garments wear out very quickly due to the miscellaneous objects carried in the pockets and it is, therefore, an object of invention to overcome this weakness by providing a reinforced pocket which can be cheaply manufactured and which shall be highly efficient in use.

The various features of novelty of the invention will appear from the detailed description thereof taken in connection with the accompanying drawing forming part of the specification.

Figure 1:
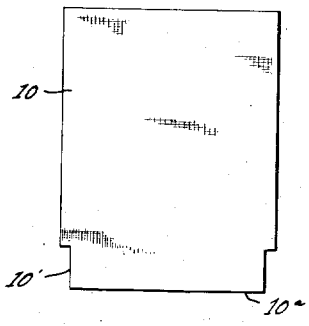
Figure 1 is a view of a piece from which the embodiment of the improved patch pocket specifically illustrated in the drawing is made.
Figure 2:
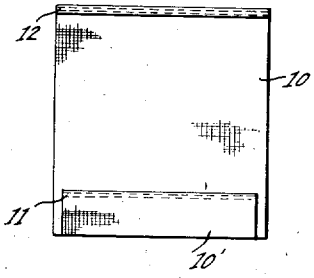
Fig. 2 is a view showing the lower part of the piece doubled and stitched to the main body portion of the piece and incidentally the upper edge hemmed.
Figure 3:
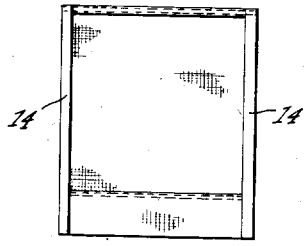
Fig. 3 shows the side edges hemmed.
Figure 4:
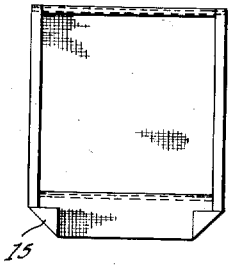
Fig. 4 shows the bottom corners turned over preparatory to attaching the piece to the body of the garment.
Figure 5:
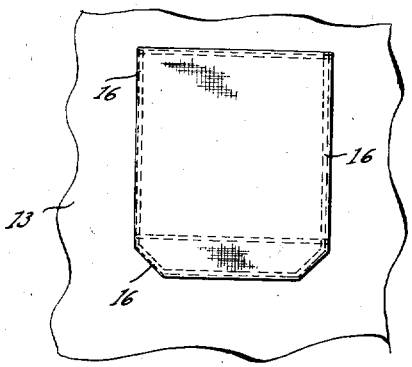
Figure 5 shows the complete pocket.

In the drawings, 10 indicates the piece of fabric or facing from which the improved pocket is made. In the particular embodiment of the invention illustrated the piece 10 is provided at its lower end with an extension 10′ that is of less width than the body of the piece and which is turned and stitched along its upper edge to the body of the piece or fabric 10 as shown at 11. The top of the piece is hemmed as shown at 12 and the piece is then ready for attachment to the body 13 of the garment. In attaching the piece to the body 13 of the garment, the side edges are first turned to overlie the reinforce 10′ (as shown by a comparison of Figures 1 and 3) as at 14 and the bottom corners also turned as at 15 and the side edges and bottom of the piece then stitched to the garment body as clearly shown in Fig. 5, numeral 16 indicating such stitching.

The above described construction provides a reinforced pocket which can be cheaply manufactured and which is efficient in use. By providing the narrowed extension 10′ at the bottom of the main piece 10 and doubling and stitching it to the main body portion of said piece not only are the manufacturing operations reduced to the simplest possible number, but a superior reinforced pocket is obtained than is the case where the reinforce 10′ is a detached member which is sewed on to the outside of the pocket as is customary. It is to be noted that the reinforce 10′ is positioned inside the pocket rather than outside, a feature which makes it unnecessary to hem the edge $10^a$ of the reinforce. The reinforce is of less width than the main body of the piece 10 so as to avoid unnecessary thickness of material when the side edges of the piece 10 are turned. By turning the corners 15 as shown, a neater appearing pocket is provided but such turning is optional as regards the main feature of the invention, which is the doubling of the lower end of the piece 10 by providing an interior reinforce 10′ of less width than the main body piece and stitching the upper edge of said reinforce to the main body portion of said piece. The reinforce extends upwardly a sufficient distance to take the wear, which ordinarily comes at the bottom of the pocket. The front wall of the pocket is thus reinforced by an interior, concealed member of less width than the main pocket piece.

The above described invention is extremely simple but marks a decided improvement in the art as the manufacturing operations are reduced to the simplest possible number, a saving in material is effected and a pocket of minimum bulk obtained.

What I claim is:—

1. The combination with a garment body, of a facing for forming a pocket therewith, said facing being of double ply construction adjacent its lower end with the inner ply of less width than the outer ply, the sides of the latter being folded over at the side edges of the inner ply, and stitching securing the sides and lower end of the facing to the said body, said inner ply being connected to the outer ply by stitching above the bottom of the pocket.

2. The combination with a garment body, of a facing for forming a pocket therewith, stitching securing the sides and lower end of the facing to the said body, the lower end of the facing being doubled over to form a reinforce for the bottom of the pocket, said doubled over portion extending upwardly and stitched at its upper edge to the facing above the stitching at the bottom of the pocket.

3. The combination as in claim 2, characterized by the said doubled over portion being disposed between the facing and the garment body.

4. The combination as in claim 2, characterized by this that the width of the doubled over portion is less than the width of the facing proper when laid out flat.

In testimony whereof I have hereunto signed my name.

ALFRED C. BARROW.